(12) United States Patent
Natanzon et al.

(10) Patent No.: US 11,709,608 B2
(45) Date of Patent: Jul. 25, 2023

(54) SMART DE-FRAGMENTATION OF FILE SYSTEMS INSIDE VMS FOR FAST REHYDRATION IN THE CLOUD AND EFFICIENT DEDUPLICATION TO THE CLOUD

(71) Applicant: EMC IP Holding Company LLC, Hopkinton, MA (US)

(72) Inventors: Assaf Natanzon, Tel Aviv (IL); David Zlotnick, Tel Aviv (IL); Boris Shpilyuck, Ashdod (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 30 days.

(21) Appl. No.: 17/172,803

(22) Filed: Feb. 10, 2021

(65) Prior Publication Data
US 2021/0165590 A1    Jun. 3, 2021

Related U.S. Application Data

(62) Division of application No. 16/391,149, filed on Apr. 22, 2019, now Pat. No. 11,301,155.

(51) Int. Cl.
*G06F 7/00* (2006.01)
*G06F 17/00* (2019.01)
*G06F 3/06* (2006.01)
*G06F 9/455* (2018.01)

(52) U.S. Cl.
CPC .......... *G06F 3/0641* (2013.01); *G06F 3/067* (2013.01); *G06F 3/0667* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,656,386 B1 * | 2/2014 | Baimetov | G06F 9/45558 718/1 |
| 8,682,870 B1 | 3/2014 | Gardner et al. | |
| 9,740,577 B1 * | 8/2017 | Chakraborty | G06F 11/1464 |

(Continued)

FOREIGN PATENT DOCUMENTS

WO    2014/117533 A1    8/2014

OTHER PUBLICATIONS

Anonymous, "All You Need to Know About Creating VM Templates in VMware," Retrieved at https://www.nakivo.com/blog/vm-templates-a-to-z/, Nov. 21, 2018, pp. 1-18.

(Continued)

*Primary Examiner* — Tuan A Pham
(74) *Attorney, Agent, or Firm* — Workman Nydegger

(57) ABSTRACT

One example method includes chunking a respective disk of each of a plurality of virtual machines (VM) to create a respective plurality of chunks associated with each of the VMs, creating, based on the chunking process, a cluster comprising one or more of the VMs, creating a VM template whose data and disk structure match respective data and disk structures of each of the VMs in the cluster, and in response to a file operation involving a first one of the VM disks, defragmenting the first VM disk so that a disk structure of the first VM disk is the same as a disk structure of the VM template.

17 Claims, 5 Drawing Sheets

(56) References Cited

U.S. PATENT DOCUMENTS

| | | |
|---|---|---|
| 2010/0057818 A1 | 3/2010 | Gao et al. |
| 2012/0017114 A1 | 1/2012 | Timashev et al. |
| 2012/0167080 A1 | 6/2012 | Vilayannur et al. |
| 2014/0089921 A1 | 3/2014 | Yang et al. |
| 2014/0115182 A1 | 4/2014 | Sabaa et al. |
| 2015/0012709 A1 | 1/2015 | Lad et al. |
| 2015/0052523 A1* | 2/2015 | Raghu ............... H04L 63/0272 718/1 |
| 2016/0048408 A1* | 2/2016 | Madhu ............... H04L 47/783 718/1 |
| 2017/0244593 A1* | 8/2017 | Rangasamy ............ H04L 67/02 |
| 2017/0277555 A1 | 9/2017 | Gautam et al. |

OTHER PUBLICATIONS

International Preliminary Report on Patentability received for PCT Patent Application No. PCT/US2019/066628, dated Nov. 4, 2021, 13 pages.

Belov et al., "VM-based infrastructure for simulating different cluster and storage solutions used on ATLAS Tier-3 sites", Journal of Physics: Conference Series, vol. 396, No. 4, 2012, 5 Pages.

\* cited by examiner

SMART DE-FRAGMENTATION OF FILE SYSTEMS INSIDE VMS FOR FAST REHYDRATION IN THE CLOUD AND EFFICIENT DEDUPLICATION TO THE CLOUD

FIELD OF THE INVENTION

Embodiments of the present invention generally relate to data protection. More particularly, at least some embodiments of the invention relate to systems, hardware, software, computer-readable media, and methods for providing cloud DR protection for VMs which have filesystems that are logically similar or identical, but are physically stored in different ways on disk.

BACKGROUND

Enterprises may generate significant amounts of important data that is typically preserved in some type of data protection environment. Such data protection environments help to ensure that the data is recoverable in the event that a disaster occurs that compromises, or prevents access to, the data. Thus, disaster recovery (DR) is a critical process for organizations.

In general, a DR to cloud system allows users to failover or to perform a DR test of virtual machines from on premise environment to a public cloud environment. To be efficient and save costs, the data is stored in a relatively cheap object storage in the public cloud and is restored to a block storage upon demand only, when a failover or DR test are initiated. The system also does not keep the data in a de-duplicated form due to the large amount of metadata needed and the slowdown expected in the rebuild of the virtual machines (VM), since the rebuild in such case will require reading data from a significantly larger amount of objects and, thus, the total cost of ownership (TCO) will be higher.

Disaster recovery plans for VMs present some particular challenges. For example, the VMs in a group may have filesystems (FS) that are almost identical logically, but the respective filesystems may be physically stored in a very different way on the disk. Further, some processes may change the location of files on a file system of a VM, such that VMs that are otherwise nearly identical may have substantial difference in their respective VMDK binary images. Moreover, files deleted from a VM filesystem are not zeroed in many cases. Thus, even if most of the VM filesystem is empty, there may still be a large amount of garbage on the disk. These circumstances are problematic.

For example, when replicating a VM to the cloud for DR purposes, and then restoring multiple, almost identical, VMs, it may be difficult or impossible to simply use a single block device as a backup template, and then keep only the differentials relative to each VM. As well, if there is a process that changes a VM filesystem structure without actually changing files, that process may cause large unnecessary differences between two versions of the VM that are otherwise practically identical.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 2 discloses aspects of an example method for creating a VM template.

DETAILED DESCRIPTION OF SOME EXAMPLE EMBODIMENTS

Figure 1:
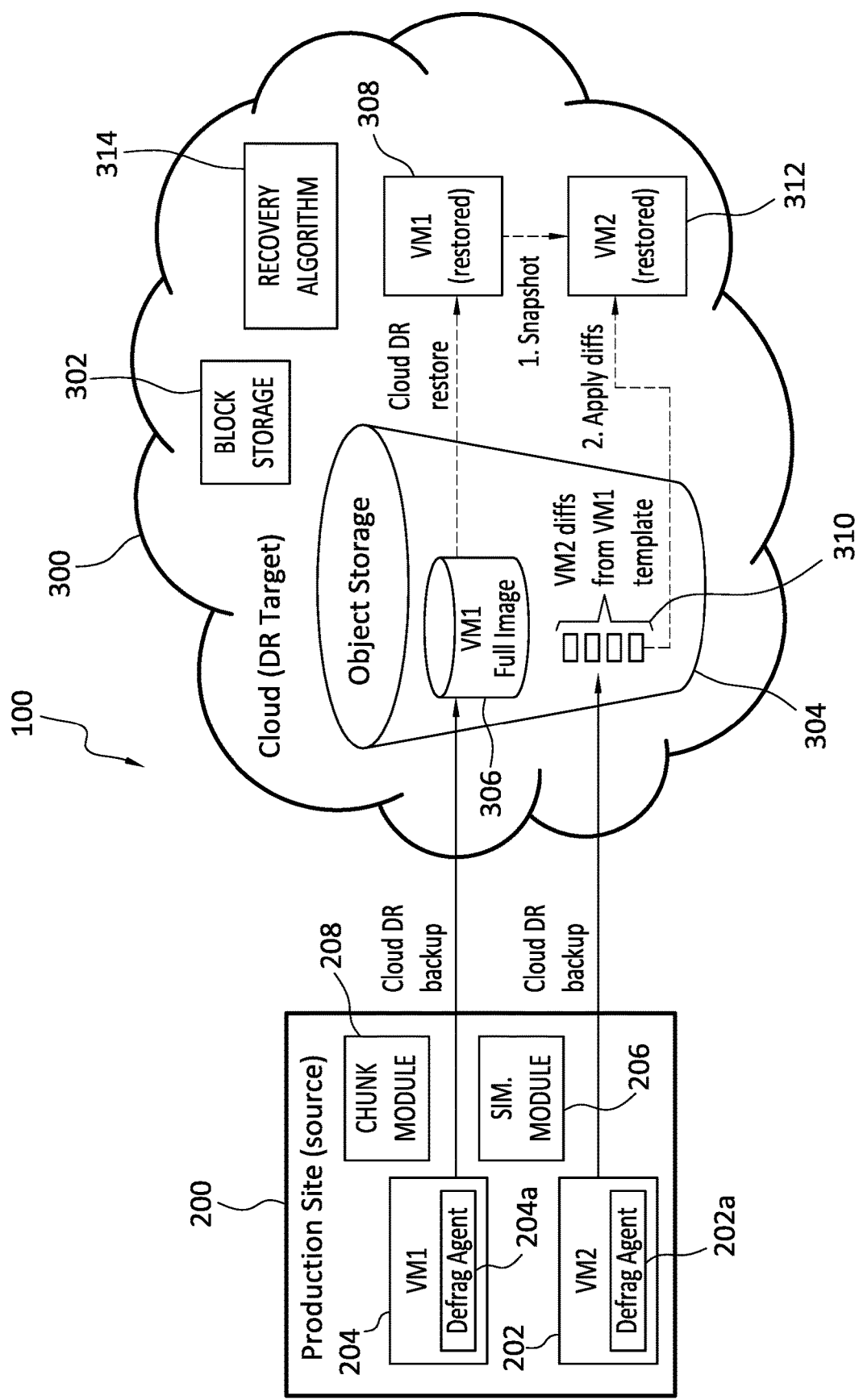
FIG. 1 discloses aspects of an example operating environment for some embodiments of the invention.

Embodiments of the present invention generally relate to data protection. More particularly, at least some embodiments of the invention relate to systems, hardware, software, computer-readable media, and methods for providing cloud DR protection for VMs which have filesystems that are logically similar or identical, but are physically stored in different ways on disk. At least some embodiments of the invention are implemented in connection with a production site that includes one or more VMs, and a cloud storage environment, such as a cloud datacenter for example, although the scope of the invention is not limited to this example environment. In general, embodiments of the invention include a method which will allow the disk layout of similar VMs to remain as similar as possible after changes, allowing customers to save cloud storage space and keep small amount of templates in the cloud, as well as enable faster recovery times in cloud DR use cases such as multi-VM failover or DR Test.

In more detail, example embodiments of the invention concern the provision of cloud DR protection for VMs which are practically similar, with very small differences. For this purpose, a similarity algorithm, and a distributed defragmentation (or 'defrag') algorithm, are provided. The similarity algorithm attempts to identify VMs that are similar to each other in terms of their respective data and filesystems, and the distributed defragmentation (or 'defrag') algorithm, such as in the form of an agent, uses predefined consistent logic to arrange data on similar VMs and attempt to put identical data at the same offsets of the disk. More particularly, the defragmentation agent is installed on production site VM clients that are desired to be protected. The defrag agent places the data on the respective VMs such that the VM disks of the protected machines that have almost identical data will also be almost identical in their disk layout.

It is important to note that due to file system properties and data movement, even identical file systems containing the same files and directories can have a very different disk structure due to different placement of the files on the disk. Thus, even versions of the same virtual machine which logically differ very little from each other may have significantly different disk binary layout.

In more detail, the defrag agent installed on each production site VM will perform a variety of functions with respect to empty disk space, and with respect to the data on the disk. For example, the defrag agent will operate such that when a file is deleted, the defrag agent will zero the data, that is, the space left open by deletion of the file is filled with zeros, and these zero areas will then be moved to the end of the disk.

As well, the defrag agents will, to the extent possible, place identical data in different, but similar, VMs in the same location on the respective VM disks. To this end, the similarity algorithm will provide a sample VM for a cluster of VMs, and the defrag agents operate to ensure that the data of the other VMs will be arranged in a similar way as in the sample VM. For example, if in a new version of the VM, some process just moved data in the file system, such as by rewriting a file with a small change for example, to a new place, the defrag agent will move the data to the same location as it was before the overwrite of the file.

Advantageously then, some embodiments of the invention may provide various benefits and improvements relative to the configuration and operation of conventional hardware, software, systems and methods. To illustrate, an embodiment of the invention includes processes for establishing and maintaining, as much as possible, a common disk configuration among a population of VMs that are to be protected. Further, an embodiment of the invention provides a single VM recovery template, which may be in the form of a full VM image that is stored in block storage at a cloud site, that can be used to restore similar VMs of the population of VMs. Because only a single VM recovery template is stored, a relatively small amount of block storage is employed as compared with an arrangement where multiple recovery images are used, thereby reducing costs since block storage tends to be more expensive than, for example, object storage. An embodiment of the invention provides for relatively fast DR processes, since a single VM recovery template is used to restore multiple, similar, VMs.

It should be noted that the foregoing advantageous aspects of various embodiments are presented only by way of example, and various other advantageous aspects of example embodiments of the invention will be apparent from this disclosure. It is further noted that it is not necessary that any embodiment implement or enable any of such advantageous aspects disclosed herein.

A. Aspects of an Example Operating Environment and Operations

The following is a discussion of aspects of example operating environments, and associated operations, for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some aspects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar platforms, as well as the Dell-EMC RecoverPoint and the VMWare SRM (Site Recovery Manager) platforms.

A data protection environment may take the form of a public or private cloud storage environment, a customer on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients, and which performs disaster recovery (DR) operations including creating and writing to recovery disks.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments (or simply 'segments') such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular attention now to FIG. 1, an operating environment 100 may comprise, or consist of, a data protection environment. The data protection environment can include an enterprise datacenter, or a cloud datacenter, or both. The data protection environment may support various data protection processes, including data replication, data deduplication, cloning, data backup, and data restoration, for example. As used herein, the term backups is intended to be construed broadly and includes, but is not limited to, partial backups, incremental backups, full backups, clones, snapshots, continuous replication, and any other type of copies of data, and any combination of the foregoing. Any of the foregoing may, or may not, be deduplicated.

In general, the example operating environment 100 in FIG. 1 comprises a production site 200, and a datacenter 300, which can be a cloud storage datacenter, although that is not necessarily required. The production site 200, which may take the form of an enterprise or organization premises for example, may include any number 'n' of production VMs 202. As well, the datacenter 300 may, but is not required to, be a public cloud site such as Amazon AWS with Amazon Elastic Block Store (Amazon EBS), Microsoft Azure, or Google Cloud.

It is noted that as used herein, the term 'VM' is broad in scope and refers generally to a virtualized representation of any combination of hardware and/or software. The disclosed VMs are not limited to performance of any particular functionality or group of functionalities. Some example VMs in connection with which embodiments of the invention may be implemented are virtualizations of components that include, but are not limited to, file systems, applications, databases, disks, processors, storage elements, memory elements, software, hardware, and any combination of these.

In general, the production VMs 202 may be involved in operations of computing systems and other systems at the production site 200, and the production VMs 202 may collectively form a cluster. One of the production VMs, designated as VM1 204 in FIG. 1, may serve as a template or sample for configuring the respective filesystem and/or data of the other production VMs 202. In some embodiments, a sample VM 204 is provided that is not a production VM.

The production site 200, or alternatively the datacenter 300, may additionally include a similarity module 206. In general, the similarity module 206 identifies those production VMs 202 that are similar to each other in terms of, for example, their respective data, and/or disk layouts. The similarity module 206 can be a stand-alone module, although that is not necessarily required. In terms of its operation, the similarity module 206 may query or poll a group of production VMs 202, either automatically or at the initiative of a user such as an administrator, to ascertain whether, and where, any such similarity exists between those production VMs 202. The extent to which a group of production VMs 202 have sufficiently similar data and disk layouts as to be designated or deemed by the similarity module 206 as being 'similar' to each other need not be fixed, although it can be, and can be defined as needed based on the requirements of a particular application or operating environment, for example. For example, an administrator or other user can define what constitutes adequate similarity between two or more production VMs 202.

There are a variety of ways to determine or decide whether or not production VMs 202 are similar to each other. One area to check in making a determination as to similarity is the different backup copies of the same VM. However, in some cases at least, it may be that most of the data will be placed at the same disk locations on the other production VMs 202. Another way to evaluate similarity is to have a user manually indicate which VMs are created by a template. In some operating environments, this data can also be retrieved using management tools like Dell-EMC VMware vRealize Automation (vRA) for example. This approach can be effective where there are also VMs which are very similar to each other due to their creation by a template, for example, user VMs, where the customer created all the VMs with similar software.

As well, the similarity module 206 may comprise, or consist of, a clustering algorithm, embodied as a clustering module at the production site 202 for example, that can be employed in connection with the chunking of the disks of the production site VMs 202. The clustering module may comprise, or consist of, the similarity module 208 and a chunk module 208.

For example, the production site 200, or alternatively the data center 300, may include the chunk module 208, which serves to chunk the disks of the production VMs 202 to relatively large pieces, such as 4 MB for example. Then, for each production VM 202, the chunk module 208 creates a vector of hashes, and runs a process which will cluster the production VMs 202 into several groups. In particular, this clustering process can be performed using a clustering algorithm such as the k-means clustering algorithm for example, where the distance between two or more production VMs 202, that is the relative similarity of those VMs 202 to each other, is determined by identifying the amount of pieces, or chunks, which are not common to the production VMs 202 under consideration. Finally, with respect to the production site 200, and as discussed in more detail below, each of the production VMs 202 may include a respective instance of a defrag agent 202a.

With continued reference to FIG. 1, the datacenter 300 serves as the DR target in at least some embodiments of the invention. That is, one or more of the production VMs 202 will be backed up at the datacenter 300. In one particular embodiment, discussed in more detail elsewhere herein, a single production VM 202 that is representative of each of the production VMs 202 in a group of production VMs 202, is backed up at the datacenter 300 and then used to restore, as part of a DR process, the production VMs 202 of the group.

The datacenter 300 may include both block storage 302, and object storage 304. As noted herein, block storage 302 may be relatively more expensive, in financial terms, than object storage 304. A full image 306 of a production VM 202, such as VM1 202, can be created and stored in the object storage 304, as part of a backup process for example. The full image 306 is later used to restore the production VM1 202 at the datacenter 300 as part of a DR process, and the restored VM1 308 is then used, in connection with any differential VM backups 310, to restore one or more of the production VMs 202 at the datacenter 300. In the example of FIG. 1, a single restored production VM2 312 is indicated, but multiple production VMs 202 can be restored at the datacenter 300, based on the restored VM1 308.

Finally, a recovery algorithm 314 is provided that may be hosted at the datacenter 300. In other embodiments, the recovery algorithm 314 can be hosted at a stand-alone server that communicates with the production site 200 and the datacenter 300. In still other embodiments, the recovery algorithm 314 can be hosted at the production site 200. In general, the recovery algorithm implements and/or causes the implementation of a DR process for the production VMs 202 by creating the restored VM1 308 and then using the restored VM1 308 and differential VM backups 310 to restore one or more of the production VMs 202 at the datacenter 300.

B. Aspects of an Example Defrag Agent

As noted earlier, each of the production VMs 202 may include a respective instance of a defrag agent 202a. When present, the template VM 204 is also provided with a defrag agent 204a. While no particular arrangement is required, the instances of the defrag agent 202a can be pushed out to their respective production VMs 202, such as by an administrator for example. Alternatively, the defrag agent 202a may be built into the production VMs 202 at the time the production VMs 202 are created. As discussed in more detail below, the defrag agent 202a on the production VMs 202 will place data on the respective VM disks such that the VM disks of the protected machines, that is, the production VMs 202, that have almost identical data to each other will also be almost identical to each other in their respective disk layouts. That is, the example defrag agent 202a comprises a distributed defragmentation algorithm which uses predefined consistent logic to arrange data on similar production VMs 202 and attempts to put identical data at the same offsets of the respective disks of the production VMs 202.

In more detail, the example defrag agents 202a perform at least the following processes, the first of which concerns empty spaces on a disk of a production VM 202. Particularly, when a file is deleted from a production VM 202 disk, the defrag agent 202a will zero the data, and will move the zero areas to the end of the disk. That is, the space made available by deletion of the file is filled with zeros, and these zero areas will then be moved to the end of the production VM 202 disk. Thus, as among a group of similar production VMs 202, not only will the disks of the production VMs 202 have the same data, but that data will be arranged in the same way on each of those disks.

That is, the similarity algorithm will provide a sample VM 204 for the cluster, and the data of the other production VMs 202 will be arranged in a similar way as in the sample VM 204, and then the defrag agent 202a will try to place identical data in different production VMs 202 in the same location on the disk. For example, if in a new version of the production VM 202, a process just moved data in the file system of that production VM 202, such as by rewriting a file with a small change for example, to a new location on the disk of the production VM 202, the defrag agent 202a will move the data at the same disk location that it was at before the overwrite of the file took place.

C. Aspects of Example Recovery Processes

With continue reference to the example defrag agent 202a, it can be see that leveraging the defrag agent 202a instances in the production VMs 202 which form a cluster, identical disk areas on different production VMs 202 can be detected and then a single template, such as VM1 204 for example, can be created, stored, and used to create an EBS, or other, disk at the datacenter 300. When restoring one or more production VMs 202, from this single cloud VM1 308, a snapshot is created of the EBS or other disk, and any changes between the snapshot and the production VM(s) 202 that are needed to be recovered are applied to that disk to generate the restored VM2(s) 312.

It is noted that embodiments of the invention can employ a template VM 204 to restore as few as a single production VM 202. However, identifying a larger set of production VMs 202 which are similar to each other will enable the use of relatively fewer templates VM1 204 and, thus, fewer full VM images to store in EBS, or the datacenter 300, which will in turn reduce the amount of relatively expensive block storage space 302 needed, and also improve DR recovery times. Because a single template, such as VM1 204 for example, can be used to restore multiple VM2s 312, thus obviating the need to create and store multiple templates and/or full VM1 images at the datacenter 300, embodiments of the invention are thus effective in implementing data deduplication. This data deduplication provides for financial savings to the customer insofar as it reduces the amount of block storage 302 consumed at the datacenter 300.

Turning now to aspects of some example DR recovery processes, embodiments of the invention operate to create a temporary recovery VM1 308 with a disk attached to it that is the same size of the VM 202 disk which is to be restored. The objects are read from the object storage 304, specifically, from the VM1 full image 306, and written to the attached disk. Next, the disk filesystem (FS) is mounted, and driver modifications to allow the disk to boot on the cloud, such as at the datacenter 300 for example, are installed. Once the disk is ready, the temporary recovery VM1 308 is shut down and the disk is attached to a new VM as the boot disk and the new VM is restored as VM2 312. Note that the non-boot disk has the same process, but there is no need to install drivers for that non-boot disk.

D. Example Host and Server Configurations

Figure 2:
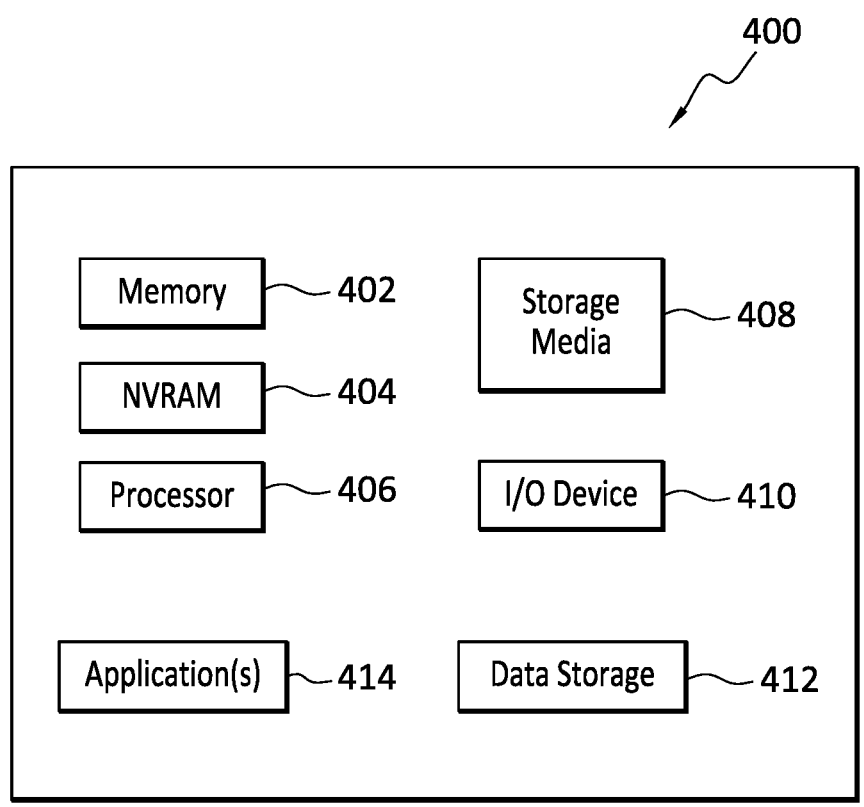
FIG. 2 discloses aspects of an example host configuration.

With reference briefly now to FIG. 2, any one or more of the components disclosed in FIG. 1 can take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 2.

In the example of FIG. 2, the physical computing device 400 includes a memory 402 which can include one, some, or all, of random access memory (RAM), non-volatile random access memory (NVRAM) 404, read-only memory (ROM), and persistent memory, one or more hardware processors 406, non-transitory storage media 408, I/O device 410, and data storage 412. One or more of the memory components 402 of the physical computing device 400 can take the form of solid state device (SSD) storage. As well, one or more applications 414 are provided that comprise executable instructions.

Such executable instructions can take various forms including, for example, instructions executable to perform any method or portion thereof disclosed herein, and/or executable by/at any of a storage site, whether on-premise at an enterprise, or a cloud storage site, client, production site, datacenter, backup and restore server, to perform functions disclosed herein. As well, such instructions may be executable to perform any of the other operations disclosed herein including, but not limited to, read, write, backup, storage, snapshot, chunking, similarity evaluation, recovery including disaster recovery, deduplication, and restore, operations.

E. Aspects of Some Example Methods

Figure 3:
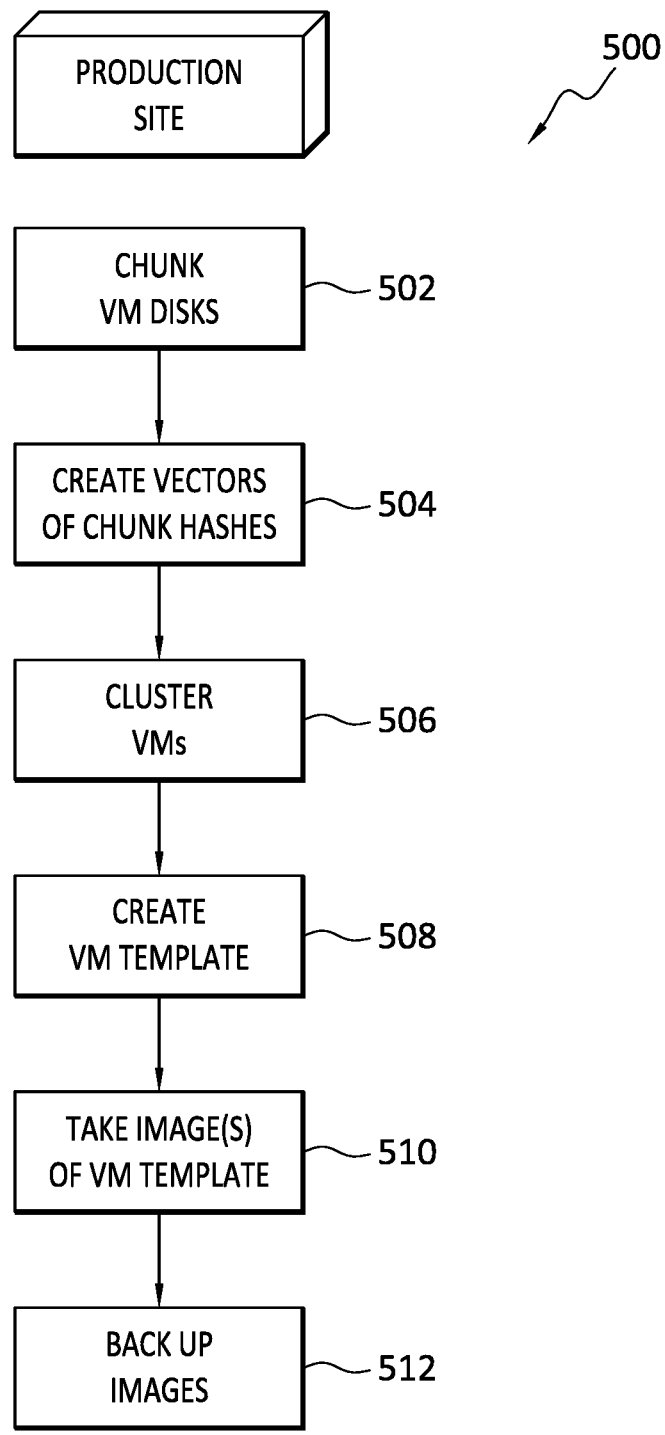

With reference next to FIG. 3, details are provide concerning methods for creating a VM template that can be used as a basis for defragmentation of the disks of a population of VMs, where one example of such a method is denoted generally at 500. The method 500 can, in some embodiments, be cooperatively performed by a chunk module and a similarity module, examples of which are disclosed herein. This functional allocation is provided only by way of example however, and is not intended to limit the scope of the invention in any way.

The method 500 can begin when the respective disks of one or more production VMs are chunked 502, such as by a chunk module for example. The disks can be chunked 502 into any suitably sized pieces. In some embodiments, the chunks are 4 MB in size, but the disks can be chunked into bigger, or smaller, pieces. Typically, though not necessarily, each chunked disk is chunked into pieces that are the same size as the chunks of the other disks.

Next, a vector of hashes of the chunks is created 504 for each of the VMs. A similarity module, for example, then evaluates the vectors and clusters 506 the VMs into one or more similarity groups, based on a comparison of the vectors with each other. In particular, this clustering process 506 can be performed using a clustering algorithm such as the k-means clustering algorithm for example, where the distance between two or more production VMs 202, that is the relative similarity of those VMs 202 to each other, is determined by identifying the amount of pieces, or chunks, which are not common to the production VMs 202 under consideration. The more chunks that two or more VMs have in common, the more similar those VMs are.

Once the similar production VMs have been identified, a VM template is then created 508, such as by a similarity module for example, where the disk structure and data of the VM template are similar, or identical, to those of the production VMs. The VM template, like the production VMs, includes an instance of a defrag agent. As changes are made by the respective defrag agents, discussed further in connection with FIG. 4, full images of the VM template are taken 510 and backed up 512 at the datacenter or other data protection environment.

Figure 4:
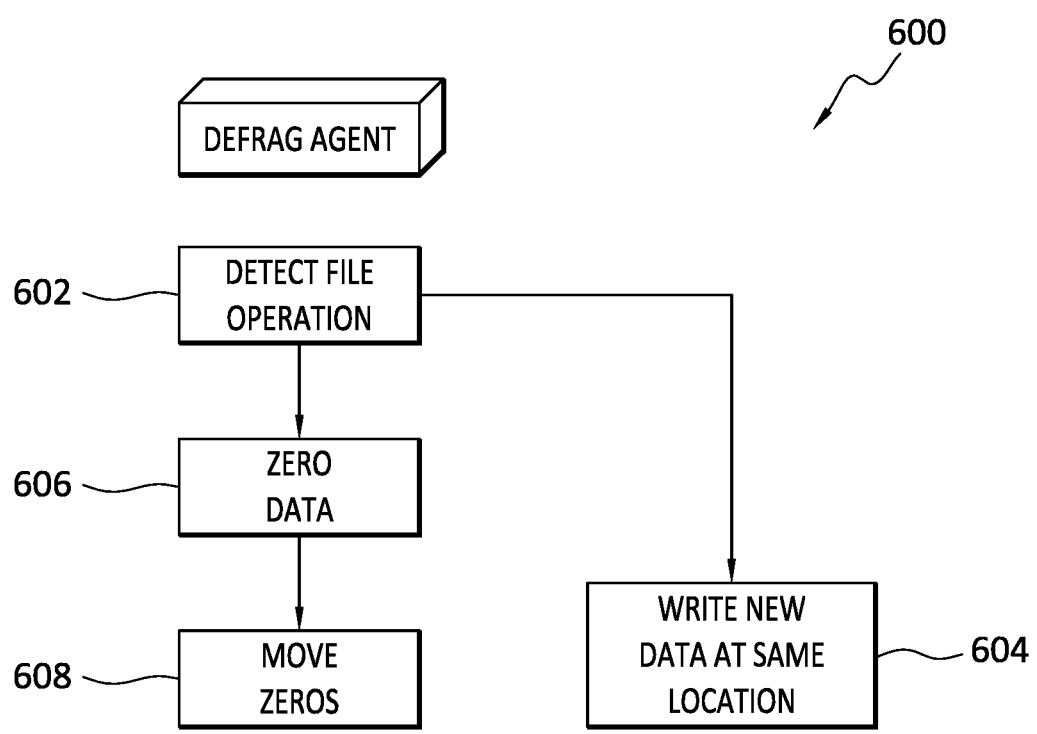
FIG. 4 discloses aspects of a method for defragmenting a VM disk.

With reference now to FIG. 4, details are provided concerning some example methods according to various embodiments of the invention, where one example method is denoted generally at 600. In general, the example method 600 is concerned with smart defragmentation of a portion, or all, of a VM, although other embodiments of the method 600 could be applied to other devices, either in whole or in part. In at least some embodiments, the portion of the VM or other device that is defragmented is part of the filesystem of that VM or other device.

Embodiments of the method exemplified by the method 600 can be performed in whole, or in part, at a production site. In particular embodiments, the method 600 is performed in whole or in part by a defrag agent of a VM, or other device, such as at a production site for example. As well, embodiments of the method exemplified by the method 600 may be performed in connection with a sample or template VM.

The example method 600 may begin when a file operation is detected 602 involving a file in the VM filesystem. The file operation may be, for example, a write or delete operation. In the case of a write operation, the data identified in the write request is written 604 to a VM disk location specified by the VM template.

When the detected file operation 602 is a file delete operation, the file data is zeroed 606, and the zeroed areas moved 608 to a particular part of the VM disk, such as the end of the disk. The particular destination specified on the VM disk for the zeroed areas can be specified in the template VM, which may be accessed, for example, by an instance of a defrag agent residing on the VM where the file deletion took place. The VM template can be created by a similarity algorithm, examples of which are disclosed herein, and the VM template may reside at a production site along with the VM whose data is being moved.

As noted, the scope of the method 600 is not limited to simply to delete operations, but may additionally, or alternatively, apply to file write and file modification operations which can be detected 602, or concerning which a notification may be received. To illustrate, if in a new version of the VM, some process just moved data in the filesystem of that VM, such as by rewriting a file with a small change for example, to a new place, the defrag agent instance at that VM will move the data to the same location as it was before the overwrite of the file. More generally, in response to a data modification operation on the VM disk, the defrag agent will move data 608 on the VM disk as indicated by the VM template.

Thus, each of the defrag agent instances at a group of VMs operates to, among other things, defragment the disk of the associated VM, and store common data at the same respective locations on each of the VM disks. In this way, the defrag agents collectively operate to ensure similar, or identical, disk structure and data on each of the VMs in a population or cluster of similar VMs. The basis for the disk structure and data to be implemented on each VM disk is provided by the VM template, accessed by the defrag agents.

Figure 5:
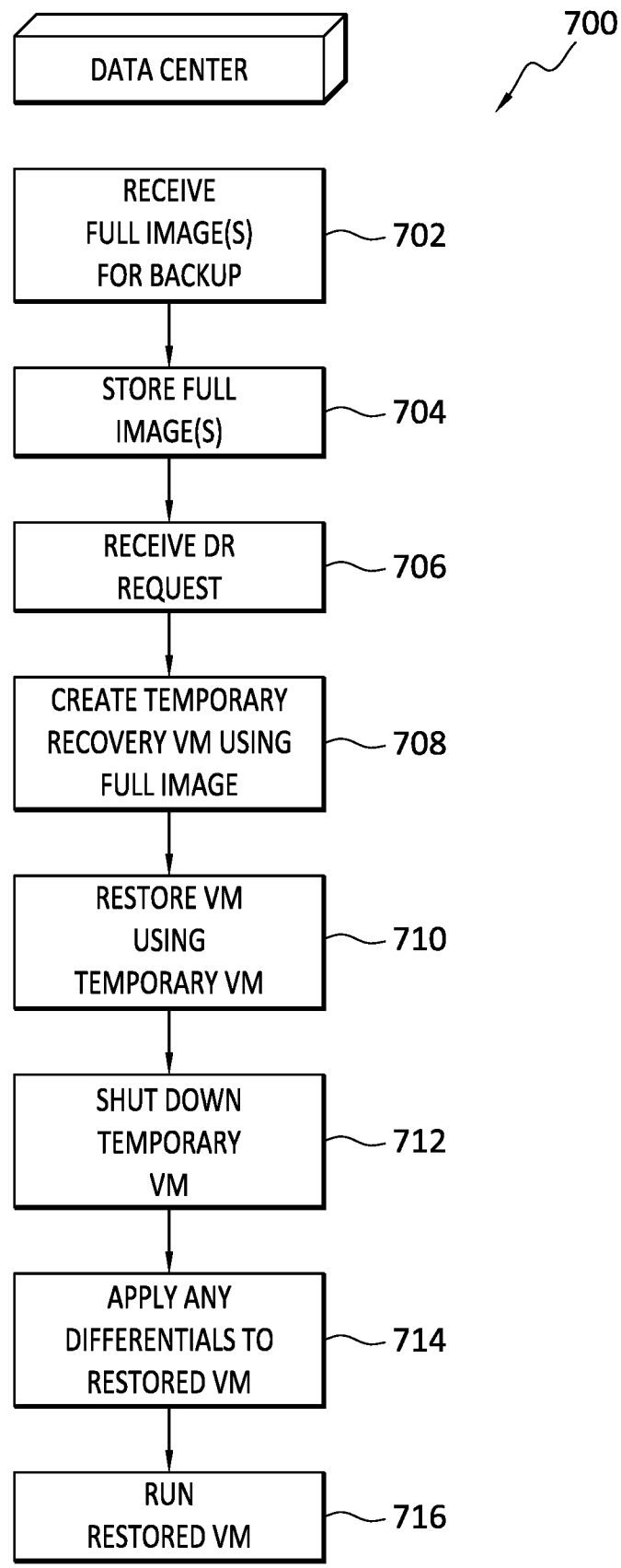
FIG. 5 discloses aspects of a method for restoring one or more VMs using a VM template.

With reference now to FIG. 5, details are provided concerning example methods of using a full image of a VM template to restore one or more VMs at a target site, such as a cloud datacenter for example. One example of such a method is denoted generally at 700 in FIG. 5. In at least some embodiments, part, or all, of the method 700 may be performed at a datacenter, such as a cloud storage site for example, although that is not necessarily required.

The method 700 can begin with receipt of one or more full images 702 for backup. The full images may be full images of a VM template, which can be located at a production site, although that is not required. The full images may be received 702 on an ad-hoc, regular, or any other, basis. After the full images have been received, they are stored at the datacenter 704, in object storage for example.

At some point after storage 704 of at least one full image of a VM template, a disaster recovery (DR) request is received 706. The DR request may be generated, and received 706, in connection with a problem at a production site. The problem may be an event, or events, that causes corruption or loss of data, such as one or more production VMs for example. The DR request, which may be received from a production site, an administrator, or other entity, may specify that one or more production VMs be restored at the datacenter and/or at another DR target site.

After receipt of the DR request 706, a temporary recovery VM is then created 708. This temporary recovery VM is created 708 based on a full image of a VM template. The full image of the VM template may reside at the datacenter. In some cases, there may be multiple full images of the VM template at the datacenter, and creation of the recovery VM can be based on any of those images. The particular full image that is used to create the temporary recovery VM 708 may be selected based on a particular restore point or time identified in the DR request.

After the temporary recovery VM has been created 708, the temporary recovery VM is then used to restore 710 the VM(s) identified in the DR request. Advantageously, a single temporary recovery VM, created based on the VM template, can be used to restore multiple production VMs, due to the established similarity between those production VMs.

When the production VM(s) have been restored 710 at the datacenter, the temporary recovery VM may then be shut down 712. If any incremental backups of the VM full image have been generated and stored subsequent to creation of the VM full image, those incremental backups, or differentials, may be applied 714 to the restored production VMs so that the restored production VMs accurately reflect the configuration, both with respect to data stored and disk structure, of the production VMs before they were impacted by the DR event. Once the restored production VMs are fully updated, they can then be placed into service and run 716. In some embodiments at least, the restored production VMs reside, and are accessible, at the datacenter. However, the restored production VMs can reside at any other DR target and are not necessarily hosted at the datacenter.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory computer readable storage medium having stored therein instructions which are executable by one or more hardware processors to perform operations comprising:
    receiving a full image backup of a virtual machine (VM) template that comprises data and a disk structure, and each virtual machine (VM) in a cluster that was used to create the VM template comprises a defrag agent operable to ensure that data and a disk structure of that VM match the data and the disk structure of the VM template;
    storing the full image backup of the VM template;
    receiving a disaster recovery (DR) request that identifies one or more target virtual machines (VMs) to be restored;
    creating a temporary recovery virtual machine (VM) based on the full image backup of the VM template;
    using the temporary recovery VM to restore one or more of the target VMs, and one of the restored target VMs has the same stored data and disk structure as that one restored target VM had prior to occurrence of an event that was the basis for the DR request; and
    applying any differential backups to a target virtual machine (VM) that has been restored.

2. The non-transitory computer readable storage medium as recited in claim 1, wherein the operations further comprise shutting down the temporary recovery VM after the one or more target VMs have been restored.

3. The non-transitory computer readable storage medium as recited in claim 1, wherein the operations are performed at a cloud datacenter.

4. The non-transitory computer readable storage medium as recited in claim 1, wherein after restoration, the restored target VMs are accessible at a cloud datacenter.

5. The non-transitory computer readable storage medium as recited in claim 1, wherein the target VMs are selected as target VMs based on their similarity to each other.

6. The non-transitory computer readable storage medium as recited in claim 1, wherein the particular full image backup of the VM template that is used in the creating is selected based on a particular restore point or time identified in the DR request.

7. A method, comprising:
   receiving a full image backup of a virtual machine (VM) template that comprises data and a disk structure, and each virtual machine (VM) in a cluster that was used to create the VM template comprises a defrag agent operable to ensure that data and a disk structure of that VM match the data and the disk structure of the VM template;
   storing the full image backup of the VM template;
   receiving a DR request that identifies one or more target VMs to be restored;
   creating a temporary recovery VM based on the full image backup of the VM template;
   using the temporary recovery VM to restore one or more of the target VMs, and one of the restored target VMs has the same stored data and disk structure as that one restored target VM had prior to occurrence of an event that was the basis for the DR request; and
   applying any differential backups to a target VM that has been restored.

8. The method as recited in claim 7, further comprising shutting down the temporary recovery VM after the one or more target VMs have been restored.

9. The method as recited in claim 7, wherein after restoration, the restored target VMs are accessible at a cloud datacenter.

10. The method as recited in claim 7, wherein the target VMs are selected as target VMs based on their similarity to each other.

11. The method as recited in claim 7, wherein the particular full image backup of the VM template that is used in the creating is selected based on a particular restore point or time identified in the DR request.

12. A system, comprising:
   one or more hardware processors; and
   a computer readable storage medium having stored therein instructions which are executable by the one or more hardware processors to perform operations comprising:
     receiving a full image backup of a virtual machine (VM) template that comprises data and a disk structure, and each virtual machine (VM) in a cluster that was used to create the VM template comprises a defrag agent operable to ensure that data and a disk structure of that VM match the data and the disk structure of the VM template;
     storing the full image backup of the VM template;
     receiving a DR request that identifies one or more target VMs to be restored;
     creating a temporary recovery VM based on the full image backup of the VM template;
     using the temporary recovery VM to restore one or more of the target VMs, and one of the restored target VMs has the same stored data and disk structure as that one restored target VM had prior to occurrence of an event that was the basis for the DR request; and
     applying any differential backups to a target VM that has been restored.

13. The system as recited in claim 12, wherein the operations further comprise shutting down the temporary recovery VM after the one or more target VMs have been restored.

14. The system as recited in claim 12, wherein the operations are performed at a cloud datacenter.

15. The system as recited in claim 12, wherein after restoration, the restored target VMs are accessible at a cloud datacenter.

16. The system as recited in claim 12, wherein the target VMs are selected as target VMs based on their similarity to each other.

17. The system as recited in claim 12, wherein the particular full image backup of the VM template that is used in the creating is selected based on a particular restore point or time identified in the DR request.

* * * * *